United States Patent [19]

Zamek

[11] Patent Number: 4,611,021

[45] Date of Patent: Sep. 9, 1986

[54] ETHER MODIFIED POLYESTER RESINS

[75] Inventor: Otto S. Zamek, Schenectady, N.Y.

[73] Assignee: General Electric Company, Waterford, N.Y.

[21] Appl. No.: 787,289

[22] Filed: Oct. 15, 1985

[51] Int. Cl.[4] .......................................... C08G 63/66
[52] U.S. Cl. ........................... 524/317; 174/110 SR; 524/376; 524/604; 528/125; 528/126; 528/128; 528/173; 528/191; 528/193; 528/194; 528/195; 528/220; 528/274; 528/296
[58] Field of Search ............... 528/125; 126, 128, 173, 528/191, 193, 194, 195, 274, 296, 220; 524/317, 376, 604

[56] References Cited

U.S. PATENT DOCUMENTS 3,288,759 11/1966 Holub et al. ..................... 528/274
4,266,017 5/1981 Martin et al. ..................... 528/296

Primary Examiner—Lester L. Lee

[57] ABSTRACT

There is provided a curable ether modified polyester resin composition comprising the reaction product of (a) at least one dicarboxylic acid, (b) at least one aliphatic polyol, and (c) at least one aromatic bis (ether dianhydride) or the corresponding tetracarboxylic acid.

22 Claims, No Drawings

ETHER MODIFIED POLYESTER RESINS

BACKGROUND OF THE INVENTION

The present invention relates to ether modified polyester resins and to substrates such as electrical conductors coated therewith. More particularly, the present invention relates to polyetheresters prepared from a dicarboxylic acid, an aliphatic diol, an aliphatic polyhydric alcohol having at least three hydroxyl groups, and an aromatic bis(ether dianhydride).

Polyester resins are well known, for example, as described in U.S. Pat. No. 2,936,296, which patent is incorporated by reference into the present disclosure. Briefly, the polyester resins described therein are the reaction product of (1) a lower dialkyl ester of a member selected from the group consisting of a terephthalic acid and isophthalic acid, and mixtures thereof, (2) ethylene glycol and (3) saturated aliphatic polyhydric alcohol having at least three hydroxyl groups. Such polyesters were found to be especially useful as insulation for electrical conductors, particularly as insulation for magnet wires used in electrical apparatus.

Holub et al., U.S. Pat. No. 3,288,759, teaches that polyester resins of the type described in U.S. Pat. No. 2,936,296 can be cured more quickly and at a lower temperature by employing a catalyst system comprising a certain class of tertiary amines and an organic polyanhydride. Holub et al. discloses a variety of dianhydrides which can be used, including aromatic bis(ether anhydrides). However, it is clear from the specification, especially column 6, lines 13–14, that the polyanhydride is employed as a crosslinking agent and is not part of the polyester backbone.

U.S. Pat. No. 3,763,109 to Witsiepe discloses thermoplastic copolyesters which combine rapid hardening rates with superior low and high temperature properties and resistance to solvents and heat aging. Such thermoplastic copolyesters consist essentially of a multiplicity of recurring intralinear long chain and short chain ester units connected head to tail through ester linkages, said long chain ester units being represented by the formula

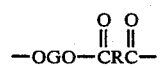

and said short chain ester units being represented by the formula

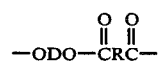

wherein G is a divalent radical remaining after removal of terminal hydroxyl groups from poly(alkylene oxide)-glycols having a carbon to oxygen ratio of about 2.0–4.3 and a molecular weight above about 400; R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250; with the proviso that the short chain ester units constitute about 66–95% by weight of the copolyester, at least about 70% of the R groups must be 1,4-phenylene radicals, at least about 70% of the D groups must be 1,4-butylene radicals, and the sum of the percentages of the R groups which are not 1,4-phenylene radicals and of the D groups which are not 1,4-butylene radicals cannot exceed about 30%. Witsiepe, however, does not disclose or suggest the presence of aromatic moieties within the ether segment of the polymer backbone.

Boldebuck et al., U.S. Pat. No. 4,074,006, provides a curable resinous coating composition which includes a polyester resin, a relatively small amount of a titanium-containing curing agent, and, optionally, up to about 1 part by weight per 100 parts by weight of resin of a surfactant such as a nonionic alkylarylpolyester alcohol which can be prepared, for example, by reacting octylphenol or nonylphenol with ethylene oxide. Such alkylarylpolyether moiety, however, is not a part of the polyester resin backbone.

Avery et al., U.S. Pat. No. 4,212,791, teaches that compositions comprising poly(alkylene terephthalate), an inert particulate nucleating agent, an oligomeric polyester as crystalization promoter, and a segmented polyester-polyether elastomer, exhibit unique crystalization enhancement. The polyester-polyether elastomers are derived from one or more dicarboxylic acids, one or more long chain glycols, and one or more short chain glycols. The long chain glycols are generally poly(alkylene ether)glycols such as poly(ethylene ether)glycol, poly(propylene ether)glycol, and poly(tetramethylene ether)glycol.

Lee et al., U.S. Pat. No. 4,354,965, assigned to the same assignee as the present invention, discloses polyetheramideimide resins prepared by condensing (A) a combination of anhydrides comprising (i) from 1 to 99 parts by weight of a dianhydride of the formula

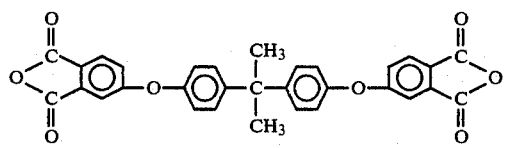

and (ii) from 99 to 1 part by weight of a tribasic acid anhydride, and (B) 0.99 to 1.01 moles per mole of anhydride of a difunctional organic nitrogen compound.

None of the foregoing references, however, disclose or suggest the use of aromatic bis(ether anhydride) to improve the high temperature properties of polyester resins.

SUMMARY OF THE INVENTION

It is an object of the present invention to provide aromatic ether modified polyester resins which exhibit improved high temperature properties.

It is another object of the present invention to provide coating compositions which contain the aromatic ether modified polyester resins of the present invention.

Still another object of the present invention is to provide substrates such as electrical conductors having thereon a cured coating of the aromatic ether modified polyester resins of the present invention.

It is also an object of the present invention to provide methods for making the foregoing aromatic ether modified polyester resin, coating composition, and coated substrate.

In accordance with the foregoing objects there is provided a curable composition comprising the reaction product of (a) at least one dicarboxylic acid;

(b) at least one aliphatic polyol; and
(c) at least one aromatic bis(ether anhydride) or the corresponding tetracarboxylic acid.

Coating compositions are prepared by dispersing the ether modified polyester resin in a suitable organic solvent, for example, benzene, toluene, xylene, Solvesso-100, a polar oxygenated solvent having at least one active hydroxyl group and comprising predominantly (i) an alkylene glycol monoether or monoester, (ii) a polyalkylene glycol monoether or monoester, or (iii) a mixture of (i) and (ii).

Coated articles can be prepared by applying a layer of coating composition on a substrate and exposing the coated substrate to elevated temperatures, for example, in the range of 140° C. to 400° C.

DESCRIPTION OF THE INVENTION

There is provided by the present invention a curable aromatic ether modified polyester resin comprising the reaction product of
(a) at least one dicarboxylic acid;
(b) at least one aliphatic polyol; and
(c) at least one aromatic bis(ether anhydride) or the corresponding tetracarboxylic acid thereof.

Component (a) can be any dicarboxylic acid known in the art to be useful for preparing polyester resins. By way of illustration, component (a) can be terephthalic acid, isophthalic acid, a lower dialkyl ester (e.g. $C_1$-$C_6$) of terephthalic acid or isophthalic acid such as dimethylterephthalate, or other reactive derivative of terephthalic or isophthalic acid; e.g. acyl halide. A minor amount of component (a) can be replaced with another dicarboxylic acid or derivative such as benzophenone dicarboxylic acid, naphthalene dicarboxylic acid, phthalic acid or anhydride, azelaic acid, adipic acid or their corresonding esters and the like. Preferably, component (a) is a mixture of terephthalic acid and isophthalic acid. Other suitable dicarboxylic acids are known in the art or can be ascertained by the artisan without undue experimentation.

Component (b) can be any aliphatic polyol known in the art to be useful in preparing polyester resins. It is especially preferable that component (b) comprise a mixture of an aliphatic diol such as, for example, ethylene glycol, propylene glycol, 1,6-hexanediol, 1,4-butanediol, or neopentyl glycol, and aliphatic polyhydric alcohol having at least three hydroxyl groups such as, for example, glycerine, 1,1,1-trimethylol propane, sorbitol, mannitol, pentaerythritol, and tris(2-hydroxyethyl) isocyanurate (THEIC). Most preferably, component (b) comprises a mixture of ethylene glycol, neopentyl glycol and glycerine.

The ratio of component (a) to component (b) is entirely conventional and especially preferred ratios will be exemplified in the examples which follow.

Component (c) can be any aromatic bis(ether anhydride) or the corresponding tetracarboxylic acid effective for imparting improved heat resistance to conventional polyester resins. Preferably, the aromatic bis(ether anhydrides) used in practicing the present invention have the general formula

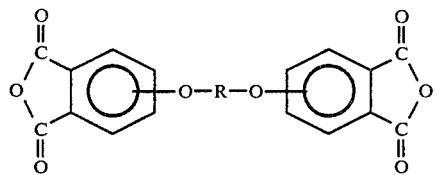

where (A) R is a radical of the formula

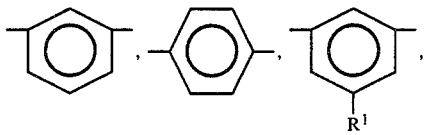

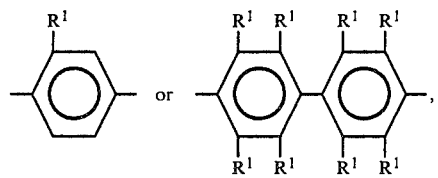

where each $R_1$ is an independently selected lower alkyl radical, halogen atom or hydrogen atom; or (B) R is a radical of the formula:

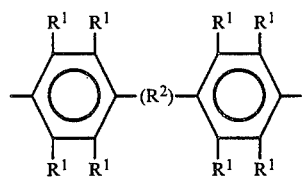

where $R^1$ is a previously defined and $R^2$ is selected from the group consisting of

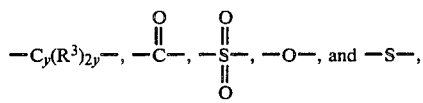

where y is an integer from 1 to 4 and $R^3$ is hydrogen, a lower alkyl radical or mixture thereof. Preferably, $R^2$ is

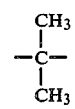

so that the preferred dianhydride is

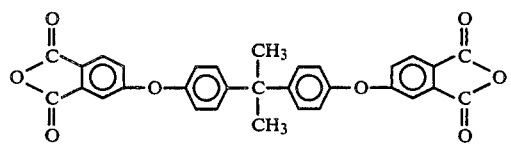

The corresponding tetracarboxylic acid would have the formula

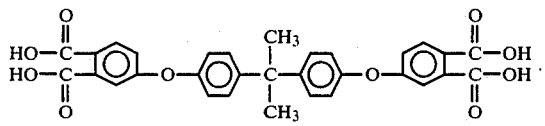

Other aromatic bis(ether anhydrides) suitable for use in the present invention include for example, 2,2-bis[4(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)diphenylsulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'-(3,4-dicarboxyphenoxy)-diphenyl-2,2-propane dianhydride, and
3,3,bis(3,4'-dicarboxyphenoxy)diphenyl ether dianhydride.

Other suitable aromatic bis(ether anhydrides will be obvious to those skilled in the art or can be ascertained without undue experimentation.

In general, the aromatic bis(ether anhydride) is present in an amount of from about 1 to about 50 parts by weight per 100 parts by weight of dicarboxylic acid and aliphatic polyol. More preferably, the aromatic bis(ether anhydride) is present in an amount of from about 2.5 to about 35 parts by weight per 100 parts by weight of dicarboxylic acid and aliphatic polyol. Most preferably, the aromatic bis(ether anhydride) is present in an amount of from about 5 to about 25 parts by weight per 100 parts by weight of dicarboxylic acid and aliphatic polyol.

The ether modified polyester resins of the present invention can include any additional components typically included by those skilled in the art. Thus, for example, there may be included an alkyl titanate catalyst such as tetraisopropyl titanate, tetramethyl titanate, tetrabutyl titanate, tetraoctyl titanate and the like. Tetraisopropyl titanate is preferred.

To make the ether modified polyester resins, the ingredients are added to a suitable reactor and heated to 200°-250° C. until no more water distills off. In a particularly preferred embodiment, a polar oxygenated solvent having at least one active hydroxyl group, as taught in U.S. Pat. No. 4,251,423 and incorporated herein by reference, is included in the reaction mixture. The polar oxygenated solvent preferably is diethylene glycol monomethyl ether, diethylene glycol monoethyl ether or diethylene glycol monobutyl ether. Most preferably, the polar oxygenated solvent is diethyleneglycol monobutyl ether.

Coating compositions (e.g. wire enamels) are prepared by adding a solvent to the thus prepared modified polyester resins after the mixture has cooled somewhat.

Any of the solvents known to be suitable for use with polyester resins can be employed, for example, cresylic acid, xylenols, phenol, mesitol, xylene, toluene, dodecane, an aromatic depth naphtha such as Solvesso-100, an additional amount of polar oxygenated solvent, or mixture thereof. Preferably, the added solvent is a blend of polar oxygenated solvent and Solvesso-100.

Preferably, there is included in the coating composition an effective amount of crosslinking agent, for example, as described in U.S. Pat. No. 2,952,665 to Bunge et al. which is incorporated by reference into the present disclosure. Mondur ® SH has been found to be an especially suitable crosslinking agent. There is also desirably added an additional amount of the previously described titanate catalyst to the coating composition.

The coating compositions thus made are applied to a substrate such as an electrical conductor in conventional fashion. Wire speeds of 15 to 65 feet per minute can be used with wire tower temperatures of 250° F. to 800° F. The build up of coating on the wire can be increased by repetitive passes through the enamel. Alternatively, the coating solution can be applied to other substrates requiring a protective coating by dipping, brushing, spraying, wiping and the like and thereafter heating the coated substrate to evaporate the solvent and effect crosslinking.

In order to better enable the artisan to practice the present invention the following examples are provided by way of illustration and not by way of limitation. All parts and percentages are by weight unless otherwise noted.

EXAMPLES

EXAMPLE 1

A wire enamel was made by charging a suitable sized flask with the following reactants:

|  | Grams |
|---|---|
| ethylene glycol | 750 |
| glycerin | 360 |
| neopentyl glycol | 140 |
| terephthalic acid | 600 |
| isophthalic acid | 900 |
| bisphenol-A dianhydride | 930 |
| diethylene glycol mono-n-butyl ether | 370 |
| tetraisopropyltitanate | 2.3 |

The mixture was heated slowly with the evolution of water to a maximum temperature of 218° C. When no more water was evolved a solid, clear resin having an acid number of 0.8 was obtained.

The resultant resin (800 grams) was dissolved in a blend of 464 grams diethylene glycol monomethyl ether and 155 grams Solvesso-100. To this solution was added 28.1 grams Mondur-SH crosslinking agent and 10.5 grams tetraisopropyltitanate in 30 grams diethylene glycol monomethyl ether and 10 grams Solvesso-100. There was thus obtained a clear solution having a viscosity of 978 centistokes at 25° C. and a solids content of 47.6%.

The enamel was applied to 18 AWG copper wire at 60 feet per minute in a conventional wire tower using seven passes. The following properties were obtained:

| Surface Appearance | Acceptable |
|---|---|

| | |
|---|---|
| Flexibility (25%) | 2x |
| Dissipation Factor (170°) | 3.7 |
| Cut Thru (°C., 2000 gm) | 337 |
| Heat Age (0%, 100 hrs at 175° C.) | 2x |

EXAMPLE 2

A wire enamel was made by charging a suitable sized flask with the following reactants:

| | |
|---|---|
| ethylene glycol | 600 |
| glycerin | 390 |
| neopentyl glycol | 140 |
| terephthalic acid | 1090 |
| isophthalic acid | 900 |
| bisphenol-A dianhydride | 160 |
| tetraisopropyltitanate | 2.3 |

The mixture was heated slowly with the evolution of water to a maximum temperature of 225° C. When no more water was evolved, a solid, clear resin having an acid number of 4.0 was obtained.

The resultant resin (700 grams) was dissolved in a blend of 515 grams diethylene glycol monomethyl ether and 145 grams Solvesso-100. To this solution was added 100 grams of a 40% solution of Mobay KL5-7005 in diethylene glycol monomethyl ether and 10 grams Solvesso-100. There was thus obtained a clear solution having a viscosity of 950 centistokes at 25° C. and a solids content of 47.4%.

The enamel was applied to 18 AWG copper wire at 60 feet per minute in a conventional wire tower using seven passes. The following properties were obtained:

| | |
|---|---|
| Surface Appearance | Acceptable |
| Flexibility (25%) | 1x |
| Cut Thru (°C., 2000 gm) | 259 |
| Heat Age (0%, 100 hrs at 175° C.) | 1x |
| Heat Shock (0%, 30 min at 155° C.) | 2x |
| Dielectric Strength (KV) | 11.2 |

I claim:

1. A curable resinous composition comprising the reaction product of
   (a) at least one dicarboxylic acid;
   (b) at least one aliphatic polyol; and
   (c) at least one aromatic bis(ether anhydride) or the corresponding tetracarboxylic acid.

2. A composition as in claim 1, wherein component (c) has the general formula

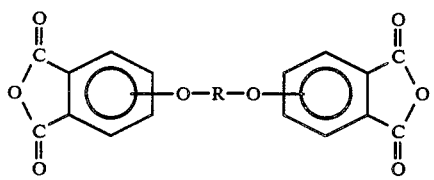

where (A) R is a radical of the formula

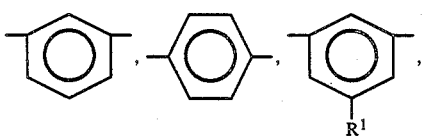

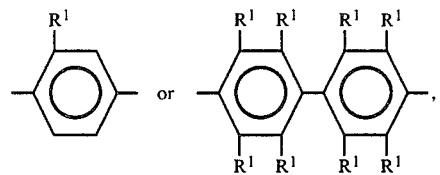

where each $R^1$ is an independently selected lower alkyl radical, a halogen atom or a hydrogen atom; or (B) R is a radical of the formula

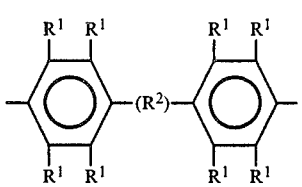

where $R^1$ is as previously defined and $R^2$ is selected from the group consisting of

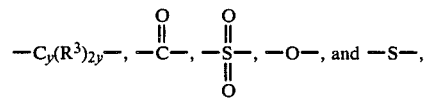

where y is an integer from 1 to 4 and $R^3$ is hydrogen, a lower alkyl radical or a mixture thereof.

3. A composition as in claim 2, wherein component (c) is

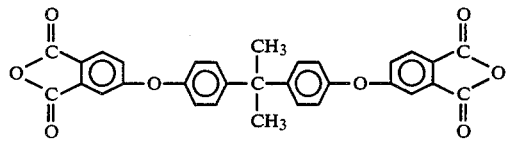

4. A composition as in claim 1, 2 or 3, wherein component (c) is present in an amount of from about 1 to about 50 parts by weight per 100 parts by weight of dicarboxylic acid and aliphatic polyol.

5. A composition as in claim 1, 2 or 3, wherein component (c) is present in an amount of from about 2.5 to about 35 parts by weight per 100 parts by weight of dicarboxylic acid and aliphatic polyol.

6. A composition as in claim 1, 2 or 3, wherein component (c) is present in an amount of from about 5 to about 25 parts by weight per 100 parts by weight of dicarboxylic acid and aliphatic polyol.

7. A composition as in claim 4, wherein the resinous composition is prepared by heating a mixture comprising components (a), (b), and (c) at a temperature of from 200° C. to 250° C. until substantially no water is evolved.

8. A composition as in claim 7, further comprising (d) a polar oxygenated solvent having at least one active hydroxyl group and comprising predominantly (i) an alkylene glycol monoether or monoester, (ii) a polyalkylene glycol monoether or monoester, or (iii) a mixture of (i) and (ii).

9. A composition as in claim 4, wherein component (a) comprises a mixture of terephthalic acid and isophthalic acid.

10. A composition as in claim 4, wherein component (b) comprises at least one aliphatic diol and at least one aliphatic polyhydric alcohol having at least three hydroxyl groups.

11. A method for making a curable resinous composition, comprising:
   I. mixing in a suitable reactor
      (a) at least one dicarboxylic acid;
      (b) at least one aliphatic polyol; and
      (c) at least one aromatic bis (ether anhydride) or the corresponding tetracarboxylic acid; and
   II. heating the mixture of step I until substantially no water is evolved.

12. A coating composition comprising
   (A) a curable resinous composition comprising the reaction product of
      (a) at least one dicarboxylic acid;
      (b) at least one aliphatic polyol; and
      (c) at least one aromatic bis(ether anhydride) or the corresponding tetracarboxylic acid; dissolved in
   (B) an effective amount of solvent.

13. A composition as in claim 12, wherein the solvent is a polar oxygenated solvent having at least one active hydroxyl group and comprising predominantly (i) an alkylene glycol monoether or monoester, (ii) a polyalkylene glycol monoether or monoester, or (iii) a mixture of (i) and (ii).

14. A composition as in claim 13, further comprising a hydrocarbon solvent.

15. A composition as in claim 12, wherein component (c) has the general formula

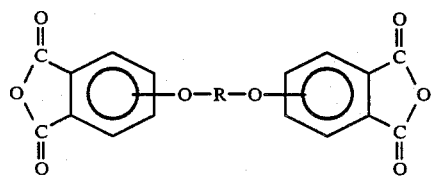

where (A) R is a radical of the formula

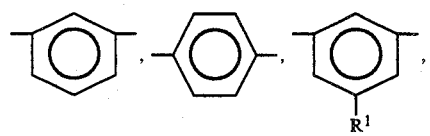

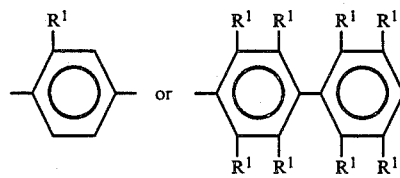

where each $R^1$ is an independently selected lower alkyl radical, a halogen atom or a hydrogen atom; or (B) R is a radical of the formula

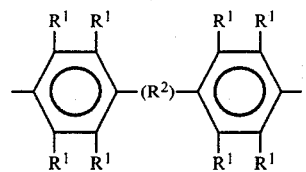

where $R^1$ is as previously defined and $R^2$ is selected from the group consisting of

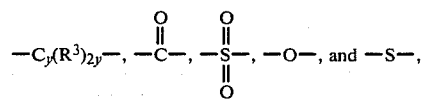

where y is an integer from 1 to 4 and $R^3$ is hydrogen, a lower alkyl radical or a mixture thereof.

16. A composition as in claim 15, wherein component (c) is

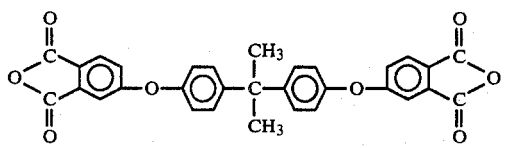

17. A composition as in claim 12, 15 or 16, wherein component (c) is present in an amount of from about 1 to about 50 parts by weight per 100 parts by weight of dicarboxylic acid and aliphatic polyol.

18. A composition as in claim 12, 15 or 16, wherein component (c) is present in an amount of from about 2.5 to about 35 parts by weight per 100 parts by weight of dicarboxylic acid and aliphatic polyol.

19. A composition as in claim 12, 15 or 16, wherein component (c) is present in an amount of from about 5 to about 25 parts by weight per 100 parts by weight of dicarboxylic acid and aliphatic polyol.

20. An article of manufacture, comprising:
   (A) a substrate having cured thereon
   (B) a resinous composition comprising the reaction product of
      (a) at least one dicarboxylic acid;
      (b) at least one aliphatic polyol; and
      (c) at least one aromatic bis(ether anhydride) or the corresponding tetracarboxylic acid.

21. An article of manufacture as in claim 20, wherein the substrate is an electrical conductor.

22. An article of manufacture as in claim 20, wherein component (c) has the general formula

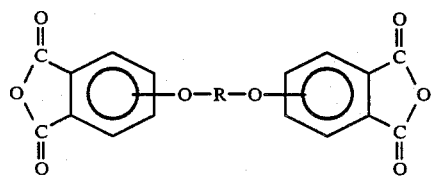

where (A) R is a radical of the formula

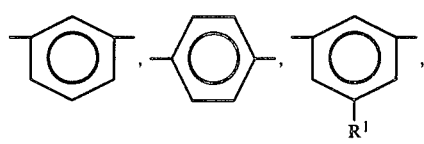 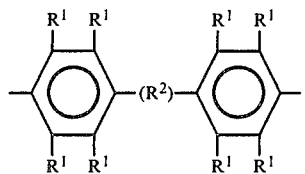
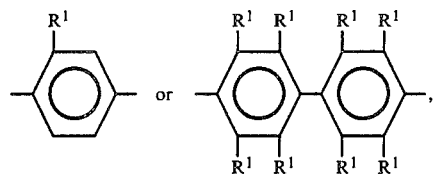
where each $R^1$ is an independently selected lower alkyl radical, a halogen atom or a hydrogen atom; or (B) R is a radical of the formula
where $R^1$ is as previously defined and $R^2$ is selected from the group consisting of
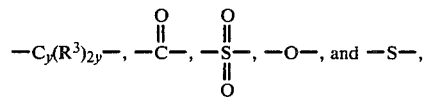
where y is an integer from 1 to 4 and $R^3$ is hydrogen, a lower alkyl radical or a mixture thereof.
* * * * *